(12) United States Patent
Lains et al.

(10) Patent No.: US 8,505,275 B2
(45) Date of Patent: Aug. 13, 2013

(54) FUEL INJECTION SYSTEMS IN A TURBOMACHINE COMBUSTION CHAMBER

(75) Inventors: Dominique Maurice Jacques Lains, Melun (FR); Denis Jean Maurice Sandelis, Nangis (FR)

(73) Assignee: Snecma, Paris (FR)

( * ) Notice: Subject to any disclaimer, the term of this patent is extended or adjusted under 35 U.S.C. 154(b) by 883 days.

(21) Appl. No.: 12/687,354

(22) Filed: Jan. 14, 2010

(65) Prior Publication Data
US 2010/0229559 A1 Sep. 16, 2010

(30) Foreign Application Priority Data

Mar. 12, 2009 (FR) ...................................... 09 01143

(51) Int. Cl.
*F02C 7/266* (2006.01)
(52) U.S. Cl.
USPC ....................................................... 60/39.827
(58) Field of Classification Search
USPC .................. 60/39.821, 740, 752, 804, 39.827
See application file for complete search history.

(56) References Cited

U.S. PATENT DOCUMENTS

| 3,668,869 A | | 6/1972 | De Corso et al. | |
|---|---|---|---|---|
| 5,257,500 A | * | 11/1993 | Venkataramani et al. | . 60/39.821 |
| 5,442,907 A | * | 8/1995 | Asquith et al. | ................... 60/778 |
| 7,942,003 B2 | * | 5/2011 | Baudoin et al. | ................. 60/748 |
| 2008/0178598 A1 | * | 7/2008 | Commaret et al. | ............. 60/748 |
| 2009/0107148 A1 | * | 4/2009 | Pieussergues et al. | .......... 60/739 |

FOREIGN PATENT DOCUMENTS

| EP | 1 870 581 A1 | 12/2007 |
|---|---|---|
| JP | 59-44508 | 3/1984 |

* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

A turbomachine including a combustion chamber provided with systems for injecting fuel into the chamber, and with at least one spark plug is disclosed. The injection system located as close as possible to the spark plug is configured in order to produce a pool of fuel having an angle of opening of a greater value than that of the pools produced by the other injection systems, and having a flow of fuel greater than that of the other injection systems.

10 Claims, 2 Drawing Sheets

FUEL INJECTION SYSTEMS IN A TURBOMACHINE COMBUSTION CHAMBER

This invention relates to a turbomachine, such as an aircraft turbojet or turboprop engine, comprising an annular combustion chamber provided with at least one spark plug and fuel injection systems inside the chamber.

BACKGROUND OF THE INVENTION

A turbomachine annular combustion chamber comprises two coaxial revolution walls which extend one inside the other and which are connected together at their upstream ends by a chamber base annular wall, this chamber base wall comprising openings for mounting the aforementioned injection systems.

The injection systems include supply ducts which extend substantially radially from an external casing of the chamber, and heads aligned axially with the openings of the chamber base wall. The head of each injector is provided with an atomizing nozzle producing a fuel cone in the chamber, this fuel cone being intended to mix with air coming from a compressor of the turbomachine in order to form a pool of air and fuel, substantially tapered enlarging downstream.

The combustion chamber is provided with at least one or two spark plugs which are intended to start the combustion of the mixture of air and fuel in the chamber. Each spark plug is mounted in an orifice of the external revolution wall of the chamber and extends towards the axis of one of the injection systems, in order to ignite the pool produced by this injection system, the flame then propagating to the neighbouring pools produced by the other injection systems.

In altitude, the low pressures, the low temperatures and the variations in the viscosity of the fuel, have for effect to reduce the angle of opening of the pools, which can interfere with the relighting of the chamber in flight.

A known solution to this problem consists in deviating radially towards the exterior the pool produced by the injection system located as close as possible to the spark plug, in such a way as to bring this pool close to the spark plug and as such favour the relighting of the chamber in flight. However, this solution is not entirely satisfactory since it does not make it possible to improve the propagation of the flame to the other pools.

SUMMARY OF THE INVENTION

The invention in particular has for purpose to provide a simple, effective and economic solution to this problem.

It proposes for this purpose a turbomachine, comprising an annular combustion chamber delimited by two coaxial revolution walls, respectively internal and external, connected together at their upstream ends by a chamber base wall comprising openings for mounting fuel injection systems, and at least one spark plug mounted in an orifice of the external revolution wall of the chamber and extending towards the axis of one of the injection systems, characterised in that at least the injection system located as close as possible to the spark plug is configured in order to produce a pool of sprayed fuel having an angle of opening of a greater value than that of the pools produced by the other injection systems, and in that the flow of fuel of this injection system is greater than that of the other injection systems.

The increase in the flow of fuel of the injection system located as close as possible to the spark plug makes it possible to locally increase the ratio of fuel of the air/fuel mixture on this spark plug, and therefore to facilitate the ignition of the pool produced by the injection system. Contrary to prior art wherein the pools provided by the injection systems all have the same ratio of fuel, the pool produced by the injection system located as close as possible to a spark plug has according to the invention a ratio of fuel greater than that of the pools produced by the other injection systems. The ratio of the air/fuel mixture thus varies in the chamber and is maximal on the or on each spark plug. The flaring of the pool produced by this injection system in addition improves the propagation of the flame to the pools produced by the adjacent injection systems, then to all of the pools. The combination of these characteristics makes it possible to ignite the combustion chamber more rapidly, in particular during a relighting in flight.

The chamber can be provided with two or three, and even more, spark plugs. In this case, each injection system located as close as possible to a spark plug has a higher flow of fuel and is configured to produce a pool having a greater angle of opening.

The flow of fuel of the or of each injection system located as close as possible to a spark plug is advantageously greater by approximately 20 to 40% than the flow of fuel of the other injection systems.

The angle of opening of the pool produced by the or each injection system located in a plane of the aforementioned type is advantageously between 80 and 100°, that of the pools produced by the other injection systems being between 50 and 70°.

The two injection systems located directly on either side of the or of each injection system located in a plane of the aforementioned type can also be configured in order to produce a pool having an angle of opening of a greater value than that of the pools produced by the other injection systems.

The atomizing nozzle of the or of each injection system located as close as possible to a spark plug can be configured in order to produce a fuel cone having an angle of opening of a greater value than that of the fuel cones produced by the atomizing nozzles of the other injection systems.

As an alternative or additional characteristic, the means for supplying air of the or of each injection system can be configured in order to produce a pool having an angle of opening of a greater value than that of the pools produced by the means for supplying air of the other injection systems.

In the case where the means for supplying air of each injection system include at least one turbulence gimlet extending around the axis of the opening of the chamber base wall and defining an annular stream of air flow in the chamber, and a mixing bowl of a tapered shape mounted downstream of this gimlet in the opening of the chamber base wall and comprising an annular row of orifices for the passing of air in the chamber, the axial dimension of the gimlet and the number and the diameter of the orifices of the mixing bowl are determined in such a way that the ratio of the section of the gimlet to the section of the orifices of the bowl are between 0.8 and 1.2 for the or each injection system located as close as possible to a spark plug, and between 1.2 and 1.4 for the other injection systems. It has effectively been observed that the higher the aforementioned ratio of an injection system is, the lower the angle of opening of the pool produced by this system is. So that all of the injection systems have the same permeability to the air, the value of the sum of the section of the gimlet and of the section of the orifices of the bowl is the same for all of the injection systems.

By way of example, the axial dimension of the gimlets of the injection systems can vary between 2.5 and 5 mm, and the number of orifices of the mixing bowls of the injection systems can be between 20 and 30, the diameter of these orifices able to be between 1.2 and 1.4 mm.

BRIEF DESCRIPTION OF THE DRAWINGS

The invention shall be better understood and other characteristics, details and advantages of the latter shall appear more clearly when reading the description which follows, provided by way of a non-restrictive example and in reference to the annexed drawings wherein.

MORE DETAILED DESCRIPTION

Figure 1:
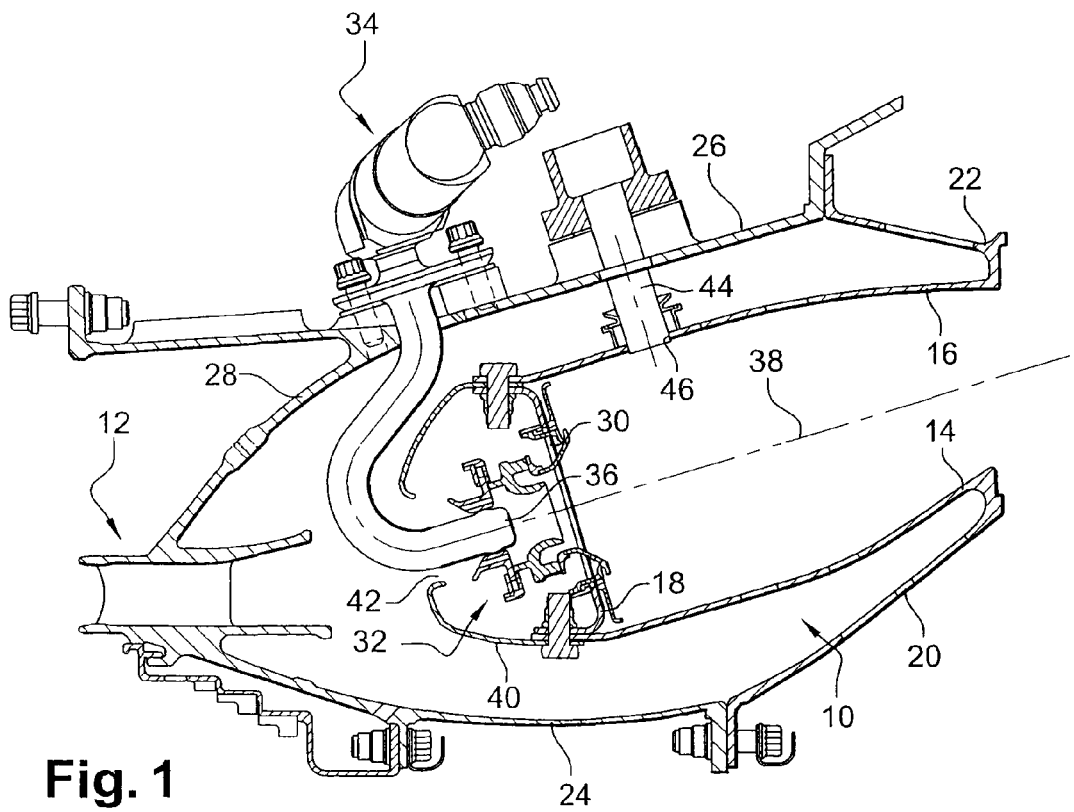
FIG. 1 is a diagrammatical half-view in axial section of a diffuser and of a combustion chamber of a turbomachine.

Reference is first made to FIG. 1 which shows an annular combustion chamber 10 for a turbomachine such as an aircraft turbojet or turboprop engine, arranged at the output of an annular diffuser 12, which is itself located at the output of a compressor (not shown).

The chamber 10 comprises an internal revolution wall 14 and an external revolution wall 16 connected upstream to a chamber base annular wall 18 and fixed downstream by respectively internal 20 and external 22 annular flanges on an internal tapered warp 24 of the diffuser, and on a downstream end of an external casing 26 of the chamber, the upstream end of this casing 26 being fixed on an external tapered warp 28 of the diffuser.

The chamber base wall 18 comprises openings 30 for mounting fuel injection systems 32 in the chamber 10, the air coming from the diffuser 12 and the fuel being supplied by injectors 34.

The injectors 34 are fixed at their radially external ends on the external casing 26 and regularly distributed on a circumference around the axis of revolution of the chamber. Each injector 32 comprises at its radially internal end a fuel injection head 36 which is aligned with the axis 38 of a corresponding opening 30 of the wall 18 of the chamber. The axis 38 is joined in the drawing with the longitudinal axis of the section of the chamber.

Each injection head 36 comprises an atomizing nozzle (not shown) for spraying a fuel cone in the chamber, along the axis 38, this fuel being intended to mix with the air coming from the compressor, such as shall be described in more detail in what follows.

An annular cowling 40 curved upstream is fixed on the upstream ends of the walls 14, 16 and 18 of the chamber and comprises orifices 42 for the passing of air aligned with the openings 30 of the chamber base wall 18.

The mixture of air and fuel injected into the chamber 10 is ignited by means of at least one spark plug 44 which extends radially inside the chamber. This spark plug 44 extends in an orifice 46 of the external wall 16 of the chamber, and its radially external end is fixed by appropriate means to the external casing 26 and connected to means of electrical power (not shown) located outside of the casing 26.

Figure 2:
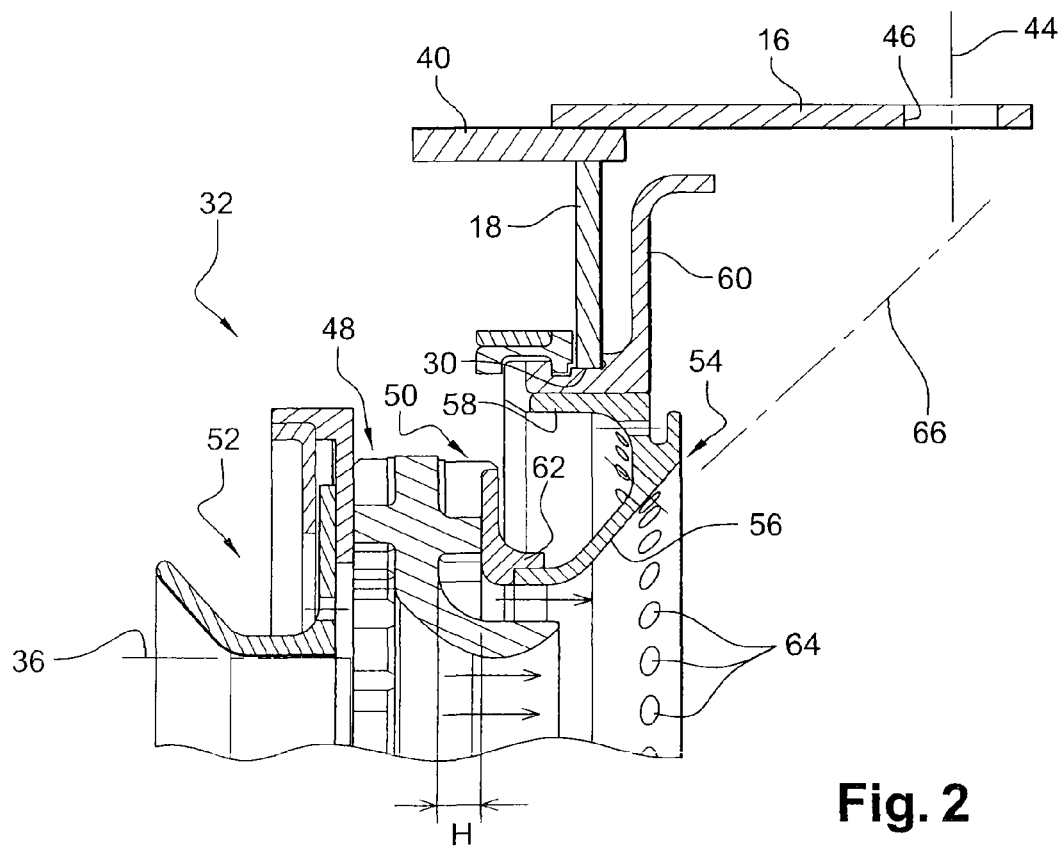
FIG. 2 is a partial enlarged view of FIG. 1 and shows a fuel injection system of the chamber.

The injection system 32, which can be seen better in FIG. 2, comprises two coaxial upstream 48 and downstream 50 turbulence gimlets connected upstream to means 52 for centring and guiding the head 36 of the injector, and downstream of a mixing bowl 54 which is mounted axially in the opening 30 of the chamber base wall 18.

The gimlets 48, 50 each include a plurality of blades extending radially around the axis of the gimlet and regularly distributed around this axis in order to deliver a flow of air in a vortex downstream of the injection head 36.

The gimlets 48, 50 are separated from one another by a radial wall 52 connected to its radially internal end to a venturi 54 which extends axially downstream inside the downstream gimlet 50 and which separates the air flows coming from the upstream 48 and downstream 50 gimlets. A first annular stream of air flow is formed inside the venturi and a second annular stream of air flow is formed inside the venturi.

The mixing bowl 54 has a substantially tapered wall 56 flared downstream and connected at its downstream end to a cylindrical rim 58 mounted axially in the opening 30 of the chamber base wall 18 with an annular deflector 60. The upstream end of the tapered wall 56 of the bowl is fixed by an intermediary annular part 62 to the downstream gimlet 50.

The tapered wall 56 of the bowl comprises an annular row of air injection orifices 64. The air passing through these orifices 64 and the air flowing in the streams inside and outside the venturi are mixed in the cone of sprayed fuel by the injector 34 in order to form a pool 66 of sprayed fuel, having a substantially tapered shape enlarging downstream.

The axis of the spark plug 44 extends in a plane passing through the longitudinal axis of the chamber and through one of the injection systems 32, this plane being the plane of the drawings in FIGS. 1 and 2. The spark plug is located in the vicinity of the downstream end of the pool 66 produced by this system in order to initiate the combustion of this pool which in turn leads to the combustion of the pools produced by the adjacent injection systems.

Figure 3:
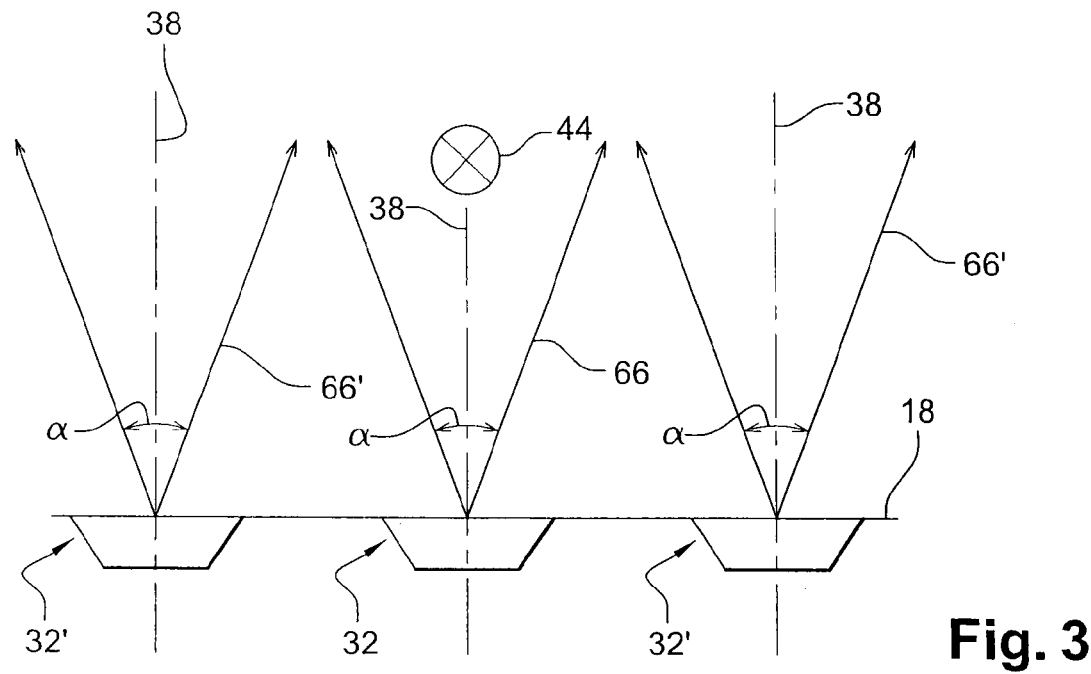
FIG. 3 is a highly diagrammatical partial view of a combustion chamber of prior art, and shows pools of sprayed fuel produced by the injection systems of this chamber.

In the current technique shown in FIG. 3, the pools 66, 66' produced by the injection systems 32 all have the same angle of opening $\alpha$ which is of a magnitude of approximately 50 to 70°, and the flow of fuel of the injectors 34 is the same for all of them (it is for example of a magnitude of 200 to 250 kg/h during a start-up). The ratio of fuel is therefore globally constant inside the chamber, along its entire edge.

As has been seen hereinabove, the relighting in flight of this combustion chamber can be hindered on the one hand by the difficulty in initiating the combustion of the pool 166 produced by the injection system 132 located in the plane of the spark plug 44, and also by the difficulty for the flame to propagate to the pools 66' produced by the adjacent injection systems 32'.

The invention makes it possible to overcome these problems by providing two types of injection systems, a first type formed by the injection systems 166 located as close as possible to a spark plug 144 and a second type formed by the other injection systems 166', i.e. those that are not in the immediate vicinity of the spark plug.

According to the invention, each injection system 132 of the first type is supplied with a flow of fuel which is higher by approximately 20 to 40% than the flow supplying the injection systems of the second type. The mixture of air and fuel injected into the chamber therefore has a ratio of fuel that is higher in each zone wherein is located a spark plug. In addition, the pool 166 formed by each injection system 132 of the first type has an angle of opening $\beta$ that is greater than the angle of opening $\alpha$ of the pools produced by the injection systems 132' of the second type.

In an example embodiment, the angle of opening β is of a magnitude of 80-100° and the angle of opening α is of a magnitude of 50 to 70°, the angle α being substantially identical to that of prior art.

Figure 4:
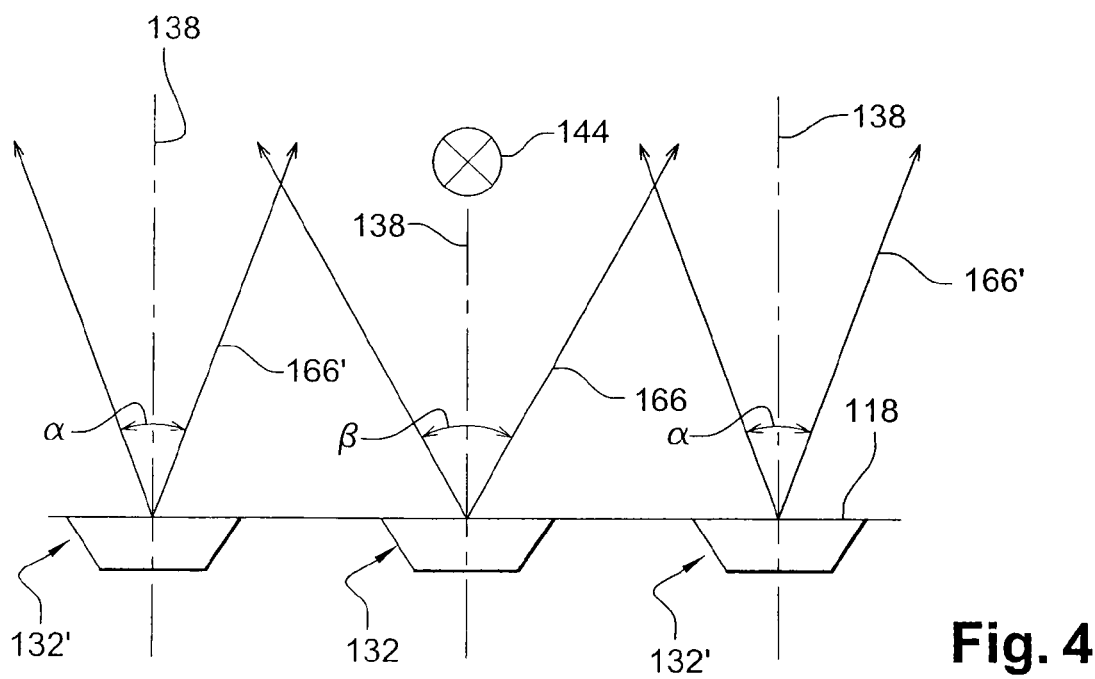
FIG. 4 is a highly diagrammatical partial view of a combustion chamber according to the invention, and shows pools of fuel produced by the injection systems of this chamber.

The axial distance between the spark plug 144 and the injection systems 132, 132' or the chamber base wall 118 is of a magnitude of 40-50 mm, this distance being measured along the axis 138 which can be seen in FIG. 4.

The angle of opening α, β of the pool produced by an injection system 132, 132' can be determined, for a given air flow, according to the ratio of the section of the secondary gimlet 50 on the section of the orifices 64 of the mixing bowl 54 of the system, and possibly of the angle of opening of the fuel cone produced by the atomizing nozzle of the injector 36 of this system.

The section of the secondary gimlet 50 is equal to $\Pi D_1 H$, H being the axial dimension of the gimlet (FIG. 2) and $D_1$ being the diameter at the output of this gimlet. The section of the orifices 64 of the mixing bowl 54 is equal to $n\Pi D_2^2/4$, n being the number of orifices and $D_2$ being the diameter of these orifices.

The higher the ratio of the section of the secondary gimlet 50 to the section of the orifices 64 of the mixing bowl 54 of an injection system is, the lower the angle of opening of the pool produced by this system is.

The parameters H, $D_1$, $D_2$ and n of the injection systems 132, 132' are determined in such a way that the aforementioned ratio of the section of the gimlet to the section of the orifices of the bowl are between 0.8 and 1.2 pour the injection system 132 of the first type, and between 1.2 and 1.4 for the injection systems of the second type. The value of the sum of the section of the gimlet and of the section of the orifices of the bowl is furthermore the same for all of the injection systems 132, 132'.

The number n of orifices 64 of the bowls 54 can be between 20 and 30, and their diameter can vary between 1.5 and 3 mm. The axial dimension H of the secondary gimlets 50 can vary between 2.5 and 5 mm.

The flow of fuel of the two injection systems 132' of the second type located directly on either side of an injection system 132 of the first type can be greater than those of the other injection systems of the second type. In addition, the angle of opening α of the pools 166' produced by these two injection systems 132' can have an intermediary value between the angle of opening β of the pool 166 produced by the injection system 132 of the first type and that of the pools of the other injection systems of the second type.

In a particular case of an embodiment of the invention, the combustion chamber 10 is provided with two spark plugs 44 which are arranged around the longitudinal axis of the chamber, at 4 o'clock and at 8 o'clock in analogy to a clock face. The two injection systems 132 aligned with these spark plugs are of the aforementioned first type, and the other injection systems 132' (in a number of 16 to 20 for example) are of the aforementioned second type.

The invention claimed is:

1. A turbomachine, comprising:
   an annular combustion chamber delimited by internal and external coaxial revolution walls;
   a chamber base wall connecting upstream ends of the internal and external revolution walls and comprising openings for mounting fuel injection systems in the chamber; and
   at least one spark plug mounted in an orifice of the external revolution wall of the chamber, and oriented towards an axis of one of the injection systems,
   wherein the injection system located closest to the at least one spark plug produces a substantially tapered pool of sprayed fuel having an angle of opening of a greater value than an angle of openings of the pools produced by other injection systems, and
   wherein a flow of fuel of the closest injection system is greater than a flow of fuel of the other injection systems.

2. The turbomachine according to claim 1, wherein the flow of fuel of said closest injection system is greater by approximately 20 to 40% than the flow of fuel of the other injection systems.

3. The turbomachine according to claim 1, wherein the angle of opening of the pool produced by said closest injection system is between 80 and 100°, and the angle of opening of the pools produced by the other injection systems is between 50 and 70°.

4. The turbomachine according to claim 1, wherein two injection systems located on either side of said closest injection system produce a pool of fuel having an angle of opening greater than the angle of opening of the pools of fuel produced by the other injection systems.

5. The turbomachine according to claim 1, wherein the turbomachine comprises at least two spark plugs.

6. The turbomachine according to claim 1, wherein each injection system comprises an fuel injector of which the head is provided with an atomizing nozzle of the fuel, the atomizing nozzle of the injection system located closest to the at least one spark plug produces a fuel cone having the angle of opening of a greater value the angle of opening of the fuel cones produced by the atomizing nozzles of the other injection systems.

7. The turbomachine according to claim 1, wherein the injection system located closest to the at least one spark plug comprises an air supplying device which produces a pool of fuel having the angle of opening of a greater value than the angle of opening of the pools produced by air supplying devices of the other injection systems.

8. The turbomachine according to claim 7, wherein the air supplying device of each injection system includes at least one turbulence gimlet extending around an axis of the opening of the chamber base wall and defining an annular stream of air flow in the chamber, and a mixing bowl of a tapered shape mounted downstream of this gimlet in the opening of the chamber base wall and comprising an annular row of orifices of the passing of air in the chamber, an axial dimension of the gimlet and the number and the diameter of the orifices of the mixing bowl being determined such that a ratio of a section of the gimlet to a section of the orifices of the bowl is between 0.8 and 1.2 for the injection system located closest to the at least one spark plug, and between 1.2 and 1.4 for the other injection systems, the value of a sum of the section of the gimlet and of the section of the orifices of the bowl being the same for all of the injection systems.

9. The turbomachine according to claim 8, wherein the axial dimension of the gimlets of the injection systems varies between 2.5 and 5 mm.

10. The turbomachine according to claim 8, wherein the number of orifices of the mixing bowls of the injection systems is between 20 and 30, and the diameter of the orifices is between 1.2 and 1.4 mm.

* * * * *

UNITED STATES PATENT AND TRADEMARK OFFICE
CERTIFICATE OF CORRECTION

PATENT NO. : 8,505,275 B2  
APPLICATION NO. : 12/687354  
DATED : August 13, 2013  
INVENTOR(S) : Dominique Maurice Jacques Lains et al.

Page 1 of 1

It is certified that error appears in the above-identified patent and that said Letters Patent is hereby corrected as shown below:

In the Claims

Column 6, line 27, change "comprises an fuel" to --comprises a fuel--; and

Column 6, line 31, change "greater value the angle" to --greater value than the angle--.

Signed and Sealed this
Twenty-sixth Day of November, 2013

Margaret A. Focarino
*Commissioner for Patents of the United States Patent and Trademark Office*